United States Patent
Herrmann et al.

(10) Patent No.: US 9,335,424 B2
(45) Date of Patent: May 10, 2016

(54) SPECTRAL PHOTON COUNTING DETECTOR

(75) Inventors: Christoph Herrmann, Aachen (DE);
Roger Steadman, Aachen (DE);
Christian Baeumer, Aachen (DE);
Guenter Zeitler, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1811 days.

(21) Appl. No.: 12/665,572

(22) PCT Filed: May 23, 2008

(86) PCT No.: PCT/IB2008/052043
§ 371 (c)(1),
(2), (4) Date: Dec. 18, 2009

(87) PCT Pub. No.: WO2008/155680
PCT Pub. Date: Dec. 24, 2008

(65) Prior Publication Data
US 2010/0187432 A1    Jul. 29, 2010

Related U.S. Application Data

(60) Provisional application No. 60/944,862, filed on Jun. 19, 2007.

(51) Int. Cl.
*G01T 1/17* (2006.01)
(52) U.S. Cl.
CPC .................................. *G01T 1/171* (2013.01)

(58) Field of Classification Search
USPC .......................................................... 250/369
See application file for complete search history.

(56) References Cited

U.S. PATENT DOCUMENTS

| | | | |
|---|---|---|---|
| 3,506,818 A * | 4/1970 | Smith | 708/827 |
| 3,747,001 A | 7/1973 | Fasching et al. | |
| 4,591,984 A | 5/1986 | Mori | |
| 6,097,025 A * | 8/2000 | Modlin et al. | 250/227.22 |
| 6,936,822 B2 | 8/2005 | Wong et al. | |
| 2006/0175540 A1 * | 8/2006 | Tsuruhara | 250/214 R |
| 2010/0096559 A1 * | 4/2010 | Yao et al. | 250/372 |

OTHER PUBLICATIONS

Gál et al. Optimization of the particle discriminator based on the ballistic deficit method using delay-switched gated integrator, Nuclear Instruments and Methods in Physics Research A vol. 399, No. 2-3 (Nov. 1997), pp. 407-413.*

F. Krummenacher, Pixel detectors with local intelligence: an IC designer point of view, Nuclear Instruments and Methods in Physical Research A305 section II Circuit design, 1991, pp. 527-532.

Blanquart, et al., Pixel analog cells prototypes for ATLAS in DMILL technology, Nuclear Instruments and Methods in Physics Research A 395, 1997, pp. 313-317.

(Continued)

*Primary Examiner* — David Porta
*Assistant Examiner* — Shun Lee

(57) ABSTRACT

An apparatus includes an integrator (120) that produces a pulse having a peak amplitude indicative of the energy of a detected photon. First discharging circuitry (136) discharges the integrator (120) at a first discharging speed, and second discharging circuitry (124) discharges the integrator (120) at a second discharging speed. The first discharging speed is less than the second discharging speed.

24 Claims, 5 Drawing Sheets

(56) References Cited

OTHER PUBLICATIONS

Ivan Peric, Design and Realization of Integrated Circuits for the Readout of Pixel Sensors in High-Energy Physics and Biomedical Imaging, Dissertation—Universitat Bonn—Physikalisches Institut, 2004, 189 sheets.

Goldan, et al., Selective Photon Counter for Digital X-ray Mammography Tomosynthesis, Medical Imaging 2006: Physics of Medical Imaging, Proceedings of SPIE, 2006, 9 sheets, vol. 6142.

Krasnokutskii, R. N., et al.; Shortening of Particle-Detector Pulses by Zero Pole Compensation; 1984; Instruments and Experimental Techniques; 27(5)1146-1151.

\* cited by examiner

SPECTRAL PHOTON COUNTING DETECTOR

CROSS REFERENCE TO RELATED APPLICATIONS

This application claims the benefit of U.S. provisional application Ser. No. 60/944,862 filed Jun. 19, 2007, which is incorporated herein by reference.

The present application generally relates to spectral photon counting detectors. While it is described with particular application to computed tomography (CT), it also relates to other applications in which it is desirable to energy-resolve detected photons having different energies.

A conventional computed tomography (CT) system includes a radiation source that emits poly-energetic ionizing (X-ray) photons that traverse an examination region. A radiation sensitive detector, located opposite the examination region from the radiation source, includes pixels that detect photons that traverse the examination region. Each pixel produces an electrical current for each detected photon, which is integrated and yields a measure for the deposited energy of all photons detected during a measurement interval.

A state-of-the-art energy-resolving counting detector such as one used in particle physics applications includes a pulse shaper that processes an electrical current indicative of a detected photon and generates an analog voltage pulse with a peak amplitude indicative of the energy of the detected photon. The detector also includes a discriminator that compares the amplitude of the voltage pulse with two or more thresholds set in accordance with two or more energy levels. The detector further includes a counter for each threshold that counts when the amplitude of a pulse rises and crosses the threshold. The counts are energy-binned into energy ranges, and the detected photons may be energy-resolved based on the binned counts.

An example pulse shaper includes an integrating amplifier with a feedback capacitor that integrates incoming charge from a pixel and a transconductance amplifier that discharges the feedback capacitor. Unfortunately, the pulse shaper produces pulses with relatively long decaying tails. As a consequence, the decaying tail of a first pulse and a rising amplitude of a subsequent pulse may overlap. When pulses overlap as such, their amplitudes may combine, shifting the amplitude of the subsequent pulse by the amplitude contribution of the first pulse. As a result, pulses may not be correctly energy-discriminated, and the energy distribution of the detected particles may be erroneously shifted.

Another pulse shaper includes an integrating amplifier in which a switch is used to discharge the feedback capacitor. Resetting the switch abruptly discharges the capacitor, which results in a considerably shorter pulse tail as compared to the tail when using the transconductance amplifier discussed in the preceding paragraph. Unfortunately, the trigger for resetting the switch requires that the pulse amplitude exceed a minimum threshold during the integration time interval. Thus, for a small input charge pulse (which, for example, may be generated in a CZT sensor due to K-Fluorescence and has an energy of less than 30 keV), the shaper may generate a pulse having a peak amplitude that is below the minimum threshold (which, in the case of a CZT sensor, may be set above 30 keV to avoid counting K-Fluorescence photons). As a result, the switch is not reset, and the output of the integrating amplifier is shifted. As a consequence, the peak amplitude of a subsequent charge pulse having energy that exceeds the minimum threshold may be erroneously shifted to a higher energy.

Aspects of the present application address the above-referenced matters and others.

According to one aspect, an apparatus includes an integrator that produces a pulse having a peak amplitude indicative of the energy of a detected photon. First discharging circuitry discharges the integrator at a first discharging speed (or rate), and second discharging circuitry discharges the integrator at a second discharging speed. The first discharging speed is less than the second discharging speed.

In another aspect, a radiation sensitive detector includes an amplifier, with an integrating capacitor, that generates a signal having an amplitude indicative of the energy of a detected photon. A voltage controlled current source discharges the integrating capacitor based on the amplitude of the signal, and a switch resets the integrating capacitor when the amplitude of the signal exceeds a photon energy threshold.

In another aspect, a method includes integrating charge to produce a pulse having a peak amplitude indicative of the energy of a detected photon, discharging a charge storage device holding the charge at a first discharge speed, and resetting the charge storage device when the peak amplitude of the pulse exceeds a photon energy threshold.

Still further aspects of the present invention will be appreciated to those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1:
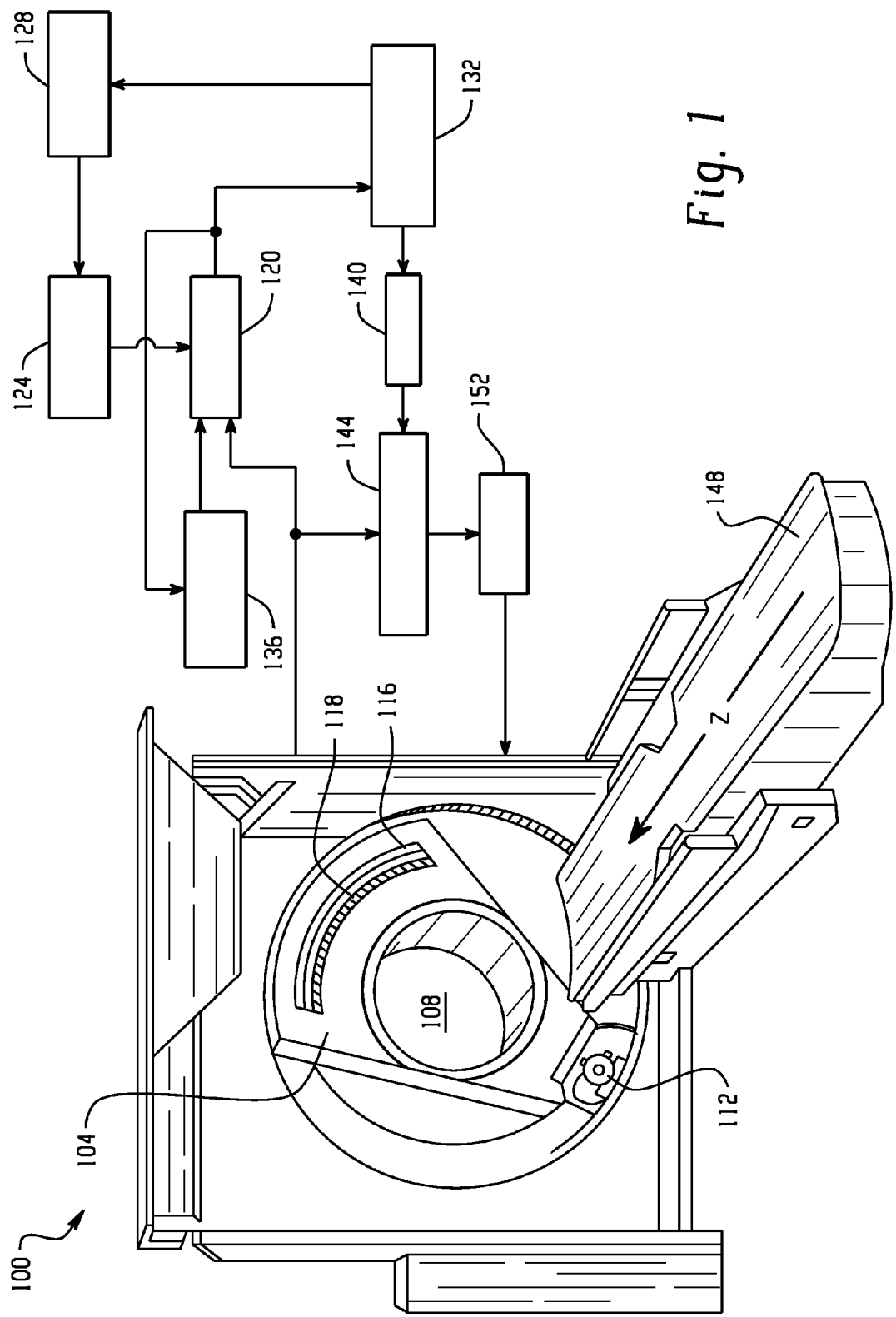
FIG. 1 illustrates an imaging system.

With reference to FIG. 1, a computed tomography (CT) system 100 includes a rotating gantry portion 104 which rotates about an examination region 108 around a longitudinal or z-axis. An x-ray source 112, such as an x-ray tube, is supported by the rotating gantry portion 104 and emits a poly-energetic radiation beam that traverses the examination region 108.

A radiation sensitive detector 116 includes a plurality of pixels 118 that detect photons emitted by the source 112 over at least one hundred and eighty degrees plus a fan angle. Each pixel 118 generates a corresponding electrical signal, such as electrical current or voltage, for each detected photon. Examples of suitable detectors include direct conversion detectors (e.g., cadmium zinc telluride (CZT) based detectors) and scintillator-based detectors that include a scintillator in optical communication with a photosensor.

An integrator 120 such as an operational amplifier with a feedback capacitor or the like processes the electrical signal and generates a pulse such as voltage or other pulse indicative of the detected photon. In this example, the pulse has a peak amplitude that is indicative of the energy of the detected photon.

An integrator resetter 124 selectively resets the integrator 120, which discharges the integrator 120. In one instance, the output of the integrator 120 transitions to a pre-integration state in response to a reset. In the illustrated example, the reset is controlled by a reset determiner 128 that determines when to reset the integrator 120 based on the integration time and an output of an energy discriminator 132 as described in greater detail below. In one instance, resetting the integrator 120 quickly discharges the charge accumulated by the integrator 120, which may reduce the time duration of a decaying pulse tail relative to letting the charge simply decay via the time constant integrator 124. The shortened tail may reduce the likelihood that a subsequent pulse will overlap the tail of the pulse.

A discharging amplifier 136 such as a voltage-controlled current source or the like discharges charge accumulated by the integrator 124 based on the output of the integrator 120. Generally, the integrator resetter 124 discharges the integrator 120 at a first discharge speed and the discharging amplifier 136 discharges the integrator at a second discharge speed, wherein the first discharge speed is faster than the second discharge speed. Discharging the integrator 120 with the discharging amplifier 136 facilitates preventing a shift in the output voltage above the intended baseline voltage. Such a shift may result when the integrator 120 integrates charge corresponding to a detected photon having energy below a minimum desired photon energy threshold, which may not trigger the integrator resetter 124. By way of example, when the integrator resetter 124 is configured not to reset accumulated charge in the integrator 120 unless a minimum desired photon energy threshold is reached (as determined from the output of the energy discriminator 132), accumulated charge corresponding to a detected photon that does not exceed the minimum desired photon energy threshold may shift the baseline, from which integration of successive charge pulses starts. The discharging amplifier 136 discharges such charge. Noise and/or leakage current may also contribute to such shifts in the baseline.

The energy discriminator 132 energy-discriminates voltage pulses generated by the pulse shaper 120, for example, by comparing the amplitudes of the generated pulses with one or more thresholds that respectively correspond to particular energy levels. The energy discriminator 132 produces an output signal when the amplitude increases and crosses a corresponding threshold. The signal for one or more of the thresholds is provided to the reset determiner 128, which uses such signal(s) when determining when to trigger the integrator resetter 124 to reset the integrator 120.

A counter 140 counts the number signals produced by each energy-discriminator 132 for each threshold. The count for each threshold is indicative of the number of detected photons having an energy that exceeds each of the thresholds. In one instance, the counter 140 counts photons at the rate of about $10^9$ counts per second per square millimeter (cps/mm$^2$). The counts are used to energy bin the detected photons in energy ranges or bins that correspond to the thresholds.

A reconstructor 144 selectively reconstructs the signals generated by the plurality of pixels 118 based on the spectral characteristics of the signals.

An object support 148 such as a couch supports a patient or other object in the examination region 108. The object support 148 is movable so as to guide the object with respect to the examination region 108 when performing a scanning procedure.

A general purpose computer serves as an operator console 152. The console 152 includes a human readable output device such as a monitor or display and an input device such as a keyboard and mouse. Software resident on the console 152 allows the operator to control and interact with the scanner 100, for example, through a graphical user interface (GUI). Such interaction may include instructions for reconstructing the signals based on the spectral characteristics.

Figure 2:
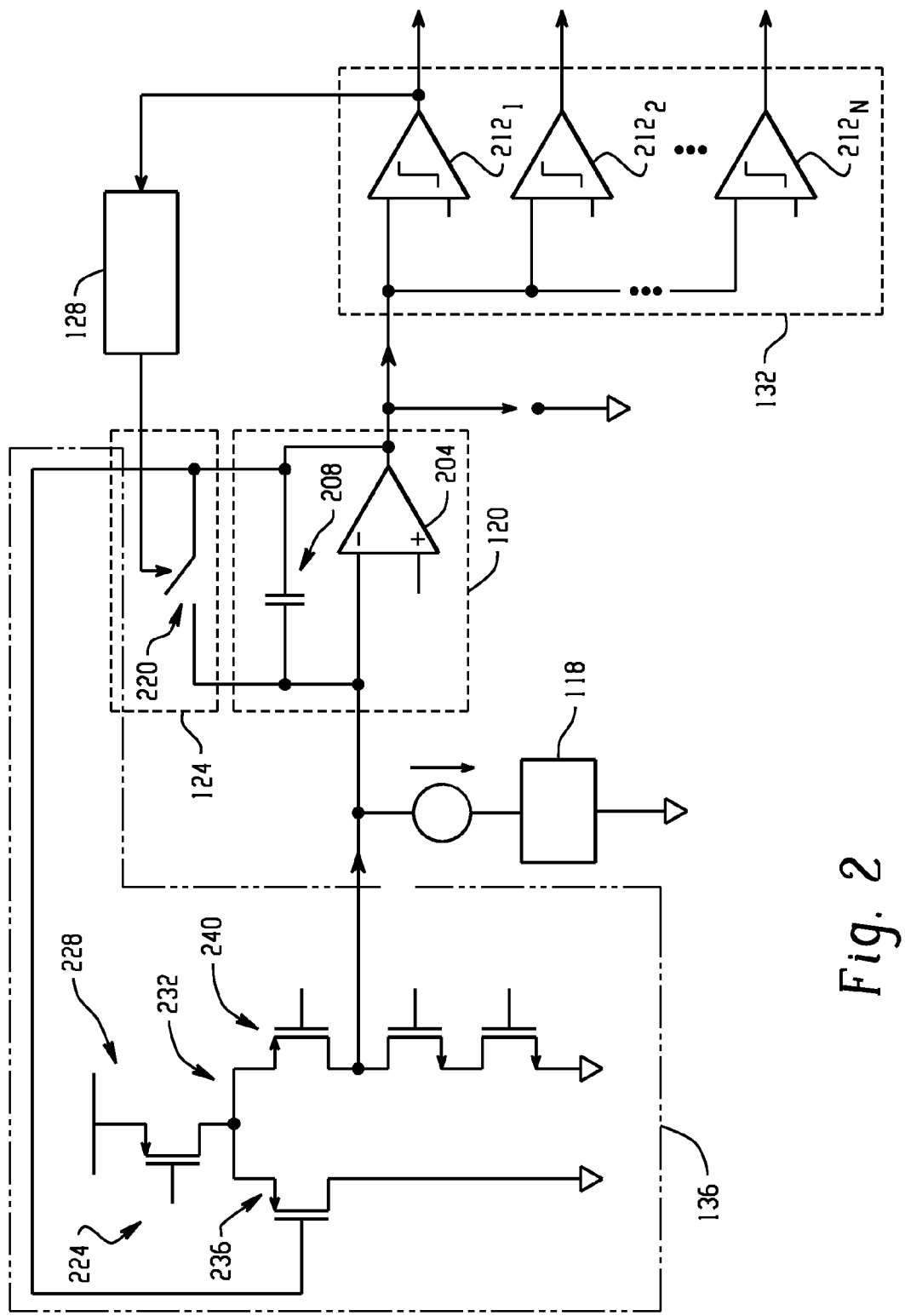
FIG. 2 illustrates an implementation of a portion of the system.

FIG. 2 illustrates an example non-limiting implementation of a portion of the system 100. In this implementation, the integrator 120 includes an operational amplifier (op-amp) 204 with a feedback capacitor 208 connected to an inverting input of the op-amp 204. The signal from the pixel 118 is also provided to the inverting input of the op-amp 204. With this example, a voltage source "HV" is employed to provide a bias voltage for the pixel 118. In the case of a CZT pixel, HV may be configured to provide a voltage of about seven hundred volts (700 V). In one instance, such a voltage is used to build-up a high internal electrical field.

The voltage pulse output by the op-amp 204 ("$V_{out}$") is provided to the energy-discriminator 132, which includes N comparators $212_1$, $212_1$, ..., $212_N$ (collectively referred to as comparators 212) for comparing the amplitude of the pulse to N different energy thresholds $TH_1$, $TH_1$, ..., $TH_N$ (collectively referred to as thresholds$_N$, or $TH_N$). In this example, $TH_1$ is the lowest threshold and $TH_N$ is the highest threshold. The output of a comparator 212 transitions from low to high (or high to low) when the pulse amplitude exceeds the corresponding threshold. The transition indicates that the detected photon has energy that exceeds the threshold. The signals from the comparators 212 are provided to respective sub-counters of the counter 140. Each sub-counter counts transitions for a corresponding threshold.

In this implementation, the integrator resetter 124 includes a switch 220 that is electrically in parallel with the feedback capacitor 208. The reset determiner 128 controls the integrator resetter 124 so that the switch 220 is closed and the capacitor 208 is shorted and discharges when the integration time lapses and the amplitude of the pulse at least exceeds the lowest threshold $TH_1$. Otherwise, the switch 220 is open. The reset determiner 128 determines when the amplitude of a pulse exceeds the lowest threshold $TH_1$ based on the output signal of the comparator $212_1$. If desired, the output from the other comparators $212_2$-$212_N$ may also be provided to and used by the reset determiner 128 to trigger the integrator resetter 124 to reset the capacitor 208.

The reset determiner 128 is configured so that a reset is triggered after the pulse has reached a maximum amplitude. This may be achieved by triggering the integrator resetter 124 after a maximum charge collection time $T_{Max}$ has lapsed. For example, the reset determiner 128 may be configured so that a reset occurs after time $T_{Max}$ from the time when integration begins, or $T_0$. When using a different starting point, for example, the time $T_1$ when the amplitude exceeds the lowest threshold $TH_1$, the reset time may be set in accordance with $T_{Max}$-$\epsilon$, wherein $\epsilon$ is the time difference, or $\Delta T$, between $T_1$ and $T_0$. The time difference $\epsilon$ may be similar for different pulse sizes. If there are considerable differences between different pulse sizes, $\epsilon$ can be selected to correspond to the shortest time needed to reach the lowest threshold $TH_1$. Using this technique, delay introduced by the integrator 120, if any, is at least partially included in the time it takes the integrator output to reach the lowest threshold $TH_1$.

Figure 3:
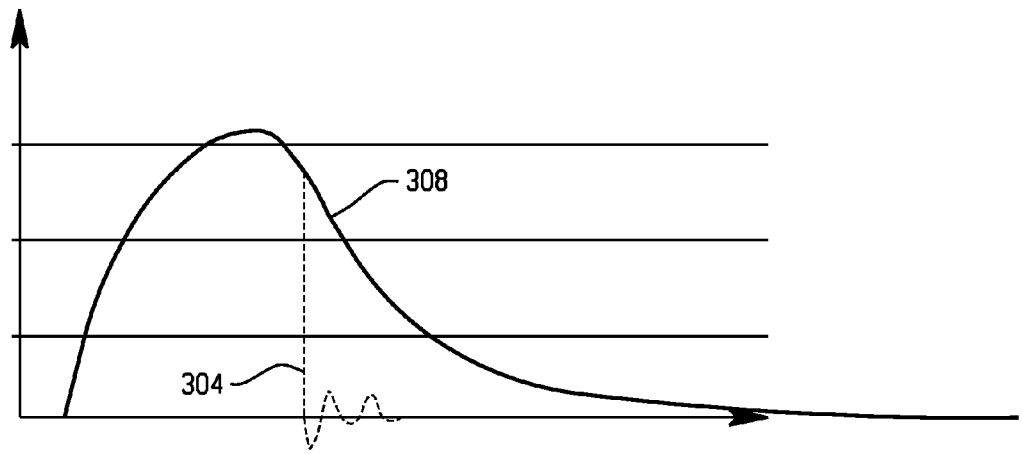
FIG. 3 illustrates pulses with and without a resetting the integrator.

An example of a pulse waveform with and without a reset is depicted in FIG. 3. The tail 304 illustrates the pulse tail when the integrator resetter 124 resets the capacitor 208 after the pulse maximum occurs. The tail 308 illustrates the pulse tail when the capacitor 208 is discharged by the discharging amplifier 136. As shown, the width of a pulse, or pulse duration can be substantially reduced via a reset by the integrator resetter 124 relative to omitting the reset. As noted above, reducing the width of a pulse as such may reduce the likelihood that a subsequent pulse will overlap the tail of the decaying pulse. Thus, reducing the width of a pulse as such may reduce energy distribution errors introduced due to piled-up pulses and/or result in a relatively higher measurable count rate.

Upon or shortly after a reset, the integrator 120 output voltage returns to the baseline, and a subsequent charge pulse from the pixel 118 can be processed starting from the baseline voltage. As noted above, the integrator resetter 124 quickly discharges the capacitor 208 when the pulse amplitude exceeds $TH_1$ after the integration time lapses. However, when the pulse amplitude does not exceed $TH_1$, the integrator resetter 124 is not invoked to discharge the capacitor 208, and the discharging amplifier 136 discharges the capacitor 208 so that the output voltage returns to the baseline.

The discharging amplifier 136 includes transconductance circuitry 224 such as a voltage-controlled current source or other transconductance amplifier. As depicted, the transconductance circuitry 224 behaves as resistive circuitry in parallel with the capacitor 208. In the illustrated implementation, a common current source 228 provides a current to a differential pair 232 of transistors 236 and 240, and the output voltage of the op-amp 204 is provided to the gate of the transistor 236. When the output voltage $V_{out}$ of the op-amp 204 rises above the baseline voltage, the voltage at the gate of the transistor 236 biases the transistor 236, and the current $I_{comp}$ output at the transistor 240 changes as a function of the output voltage $V_{out}$. The current $I_{comp}$ generally has a direction, or sign, opposite of that of the charge from the pixel, thereby cancelling the input charge so that the voltage across $C_F$ is brought back to $V_{out}$-$V_{PreRef}$=0. As such, the output voltage of the op-amp 204 steers the transconductance circuitry 224 so as to discharge the capacitor 208.

Thus, in this implementation, the pulse duration of pulses that have energy within the range of energies that are measured by the discriminator 132 ("measurable pulse") is shortened via the integrator resetter 124, which reduces the likelihood of pulse-pile up. For pulses with peak amplitudes that do not exceed the lowest threshold, the discharging amplifier 136 discharges the capacitor 208.

Figure 4:
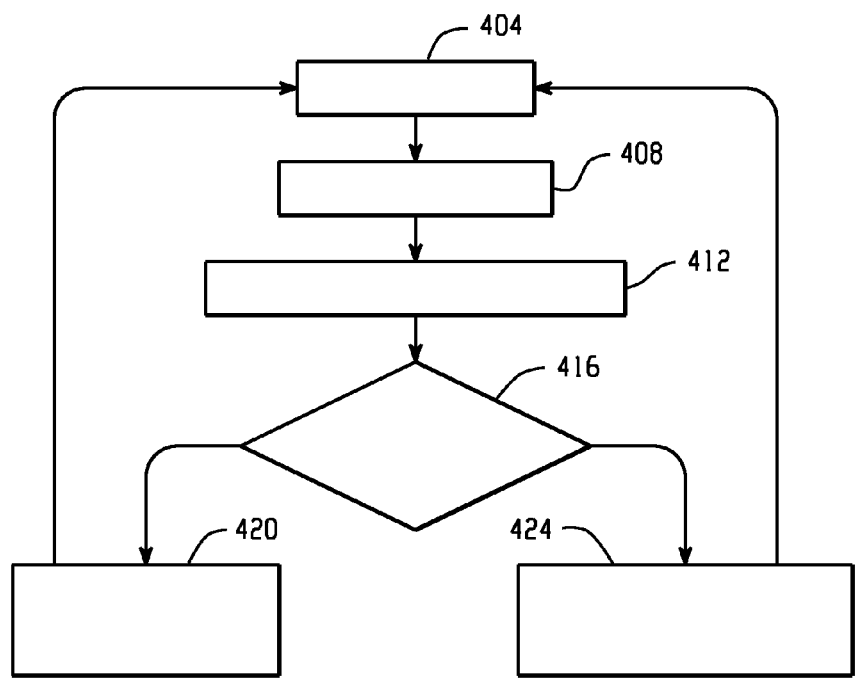
FIG. 4 illustrates a method.

Operation will now be described in connection with FIG. 4. At 404, a photon is detected. At 408, charge indicative of the detected photon is integrated by an integrating amplifier. The pulse has an amplitude indicative of the energy of the photon. At 412, the pulse is energy-discriminated across multiple energy thresholds. At 416, it is determined whether the amplitude of the pulse exceeds a threshold corresponding to a minimum desired threshold. At 420, if the amplitude of the pulse exceeds such threshold, the integrator resetter 124 resets the integrating amplifier 120. After being reset, the output of the integrator 120 returns to the baseline voltage, and the integrator 120 can integrate charge corresponding to a subsequently detected photon. At 424, if the peak amplitude of the pulse does not exceed this threshold, the accumulated charge is discharged via the discharging amplifier 136, and the integrator 120 can integrate charge corresponding to a subsequently detected photon. As noted above, energy-discriminated pulses are used to energy-resolve detected photons, and the signals from the plurality of pixels 118 are reconstructed based on spectral characteristics of the detected photons.

Variations are described.

Figure 5:
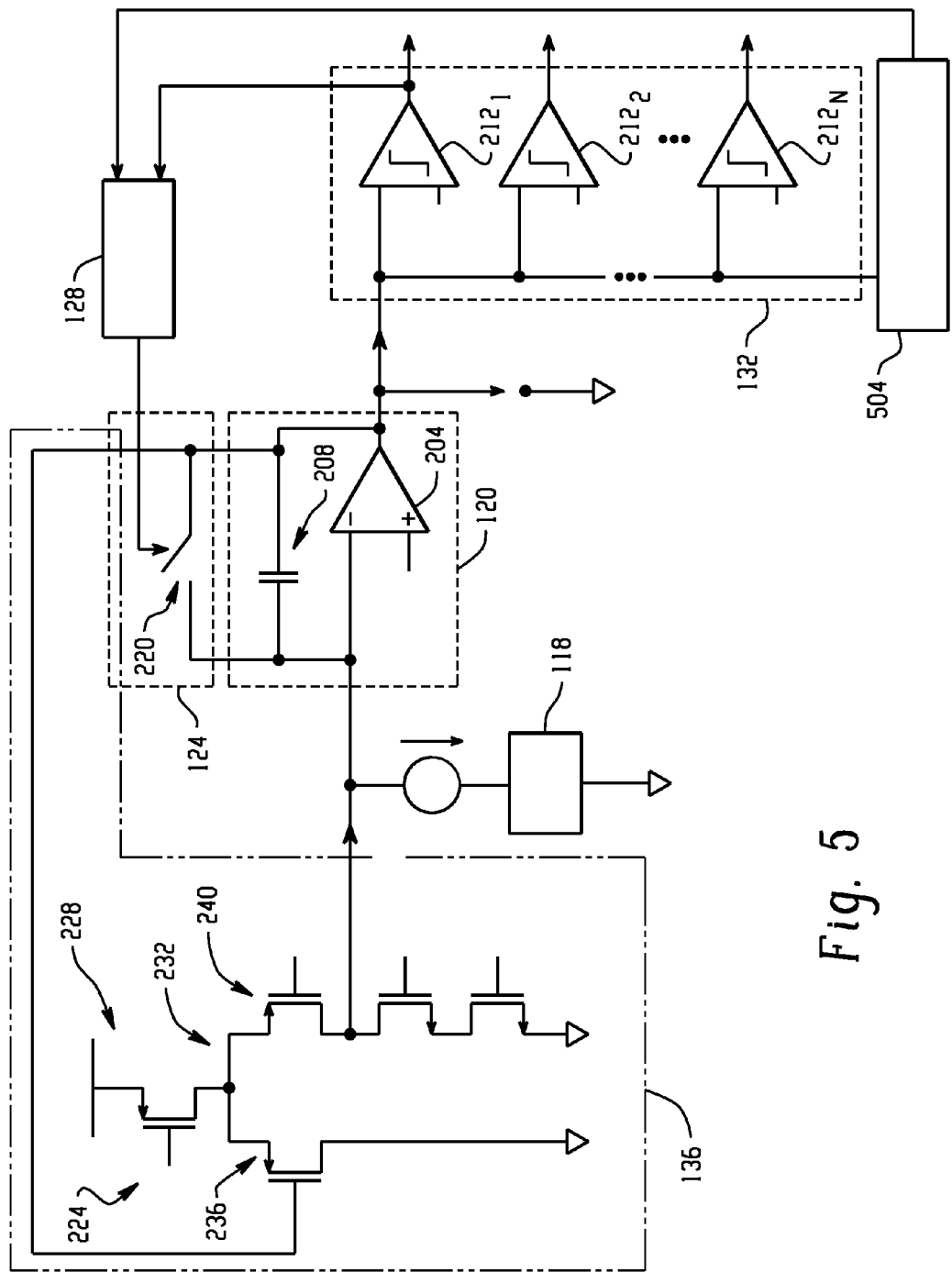
FIG. 5 illustrates an implementation of a portion of the system.

In an alternative embodiment, the peak amplitude of a pulse is also used to determine when to trigger the integrator resetter 124 to discharge the capacitor 208. An example is depicted in FIG. 5, which shows the system 100 with a pulse amplitude maximum identifier 504 such as a differentiator or other maximum identifier that locates the peak amplitude of a pulse. As shown, the output of the pulse amplitude maximum identifier 504 and the output of the comparators 212$_1$ is provided to and used by the reset determiner 128 to determine when to trigger the integrator resetter 124 to discharge the capacitor 208. In other embodiments, just the maximum amplitude is used by the reset determiner 128.

Figure 6:
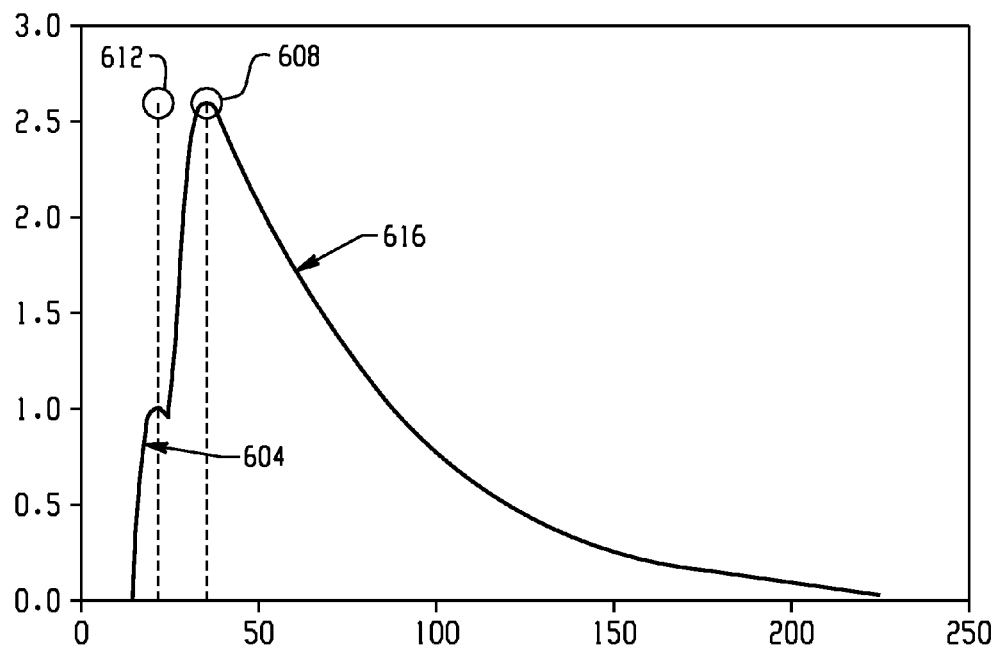
FIG. 6 illustrates piled-up pulses.
Figure 7:
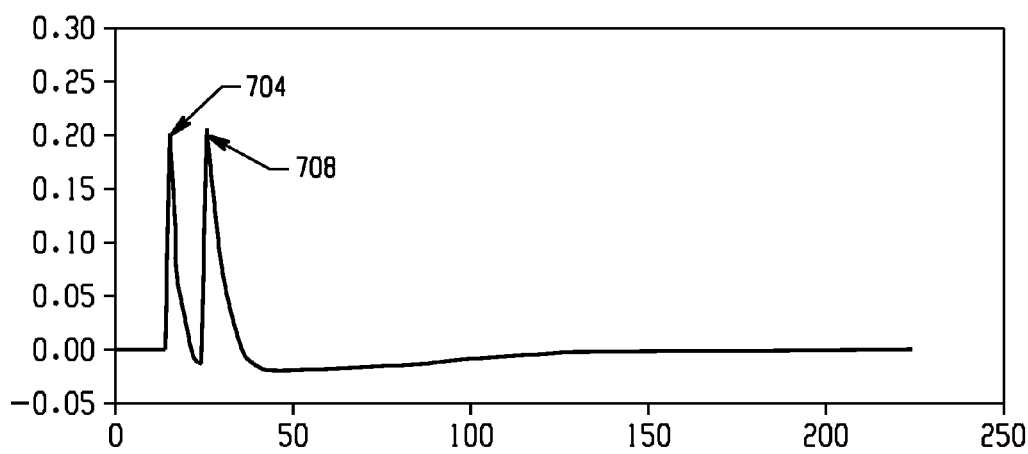
FIG. 7 illustrates differentiated piled-up pulses.

In the illustrated implementation, the pulse amplitude maximum identifier 504 determines when a maximum amplitude is reached when it sees the amplitude transition from increasing to decreasing, or a falling (from positive to negative) zero crossing. As shown in FIG. 6, the pulse amplitude maximum identifier 504 detects maximum amplitudes 604 and 608 in overlapping pulses 612 and 616. In this example, the integrator resetter 124 is triggered to reset the capacitor 208 when the maximum amplitude 604 for pulse 612 is detected, and the pulse 616 is disregarded. In other embodiments, the pulse 616 is not disregarded. FIG. 7 shows the differentiated output signals 704 and 708 for respective pulses 604 and 608.

Applications also include luggage inspection, non-destructive testing, medical digital fluoroscopy, mammography, x-ray, as well as other industrial and medical applications.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. An apparatus, comprising:
    an integrator that produces at its output a pulse having a peak amplitude indicative of the energy of a detected photon;
    a pulse maximum amplitude identifier that identifies the peak amplitude of the pulse;
    first discharging circuitry that discharges the integrator at a first discharging speed; and
    second discharging circuitry that discharges the integrator, in response to identifying the peak amplitude of the pulse, at a second discharging speed, wherein the first discharging speed is less than the second discharging speed.

2. The apparatus of claim 1, wherein the first discharging circuitry produces a compensation signal that is provided to the input of the integrator to discharge the integrator.

3. The apparatus of claim 2, wherein the compensation signal is a function of the amplitude of the pulse.

4. The apparatus of claim 1, wherein the first discharging circuitry includes a transconductance amplifier that discharges a charge storage device of the integrator.

5. The apparatus of claim 4, wherein the transconductance amplifier produces an output signal based on the amplitude of the pulse, and the output signal is provided to the input of the integrator.

6. The apparatus of claim 1, wherein the first discharging circuitry discharges the integrator so that a voltage across an integrating capacitor of the integrator is brought back to $V_{out}$-$V_{PreRef}$=0, wherein $V_{out}$ is the output voltage of the integrator and $V_{PreRef}$ is a reference voltage.

7. The apparatus of claim 1, further including a reset determiner that produces a signal when an amplitude of the pulse exceeds a photon energy threshold, wherein the second discharging circuitry discharges the integrator based on the signal.

8. The apparatus of claim 1, wherein the second discharging circuitry includes a switch that shorts the integrator.

9. The apparatus of claim 1, wherein discharging the integrator with the second discharging circuitry shortens a time duration of a decaying tail of the pulse.

10. The apparatus of claim 1, further including:
an energy discriminator that generates a signal indicative of whether an amplitude of the pulse exceeds a photon energy threshold; and
a reset determiner that triggers the second discharging circuitry to discharge the integrator based on the signal.

11. The apparatus of claim 1, wherein the second discharging circuitry discharges the integrator based on the identification of the peak amplitude, which varies from pulse to pulse based on an energy of the corresponding detected photon and is not a preset threshold.

12. The apparatus of claim 1, wherein the apparatus forms part of a computed tomography system.

13. A radiation sensitive detector, comprising:
an amplifier, with an integrating capacitor, that generates a signal having a peak amplitude indicative of the energy of a detected photon;
a voltage controlled current source that discharges the integrating capacitor based on an amplitude of the signal; and
a switch that resets the integrating capacitor when in response to detecting the peak amplitude of the pulse.

14. The radiation sensitive detector of claim 13, wherein the voltage controlled current source produces a compensation signal, which is a function of the signal of the amplifier, that is provided as an input to the amplifier to discharge the integrating capacitor.

15. The radiation sensitive detector of claim 13, wherein the signal output by the amplifier steers the voltage controlled current source.

16. The radiation sensitive detector of claim 13, wherein charge accumulated in the integrating capacitor discharges at a first discharging speed through the switch and at a second discharging speed via the voltage controlled current source, wherein the first discharging speed is faster than the second discharging speed.

17. The apparatus of claim 13, wherein the switch discharges the integrating capacitor when the amplitude of the pulse exceeds a photon energy threshold.

18. A method, comprising:
integrating charge to produce a pulse having a peak amplitude indicative of the energy of a detected photon;
discharging a charge storage device holding the charge at a first discharge speed; and
resetting the charge storage device in response to detecting the peak amplitude of the pulse.

19. The method of claim 18, wherein resetting the charge storage device discharges the stored charge at a faster speed relative to discharging the charge storage device at the first discharge speed.

20. The method of claim 18, further including identifying the peak amplitude by detecting a transition in the pulse amplitude from rising to falling.

21. The method of claim 20, further including identifying the peak amplitude by differentiating the pulse.

22. The method of claim 18, further including resetting the charge storage device through a switch.

23. The method of claim 18, further including discharging the charge on the storage device through a transconductance amplifier.

24. The method of claim 18, further including shortening a width of the pulse by shorting the charge storage device.

* * * * *